(12) United States Patent
Berger et al.

(10) Patent No.: US 10,382,500 B2
(45) Date of Patent: Aug. 13, 2019

(54) SYSTEMS AND METHODS FOR BINDING ONLINE CONTENT ACCOUNTS

(71) Applicant: Microsoft Technology Licensing, LLC, Redmond, WA (US)

(72) Inventors: Erran Berger, San Francisco, CA (US); Vinodh Jayaram, Fremont, CA (US); David Michael Breger, San Francisco, CA (US); Aaron Bronzan, San Francisco, CA (US); Christine Wendling, San Jose, CA (US); Avery Randolph Moon, Redwood Shores, CA (US); Elliot Shmukler, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 140 days.

(21) Appl. No.: 14/192,201

(22) Filed: Feb. 27, 2014

(65) Prior Publication Data
US 2014/0245188 A1    Aug. 28, 2014

Related U.S. Application Data

(60) Provisional application No. 61/770,299, filed on Feb. 27, 2013.

(51) Int. Cl.
| | |
|---|---|
| *H04L 7/033* | (2006.01) |
| *H04L 29/06* | (2006.01) |
| *G06Q 10/10* | (2012.01) |
| *G06Q 50/00* | (2012.01) |
| *H04L 29/08* | (2006.01) |

(52) U.S. Cl.
CPC .......... *H04L 65/403* (2013.01); *G06Q 10/10* (2013.01); *G06Q 50/01* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 8,682,926 B1 * | 3/2014 | Braytenbaum | ... G06F 17/30699 705/319 |
| 2010/0082683 A1 | 4/2010 | Law et al. | |
| 2010/0169363 A1 * | 7/2010 | Gaedcke | ........... G06F 17/30867 707/769 |
| 2010/0299276 A1 | 11/2010 | Shahine et al. | |

(Continued)

OTHER PUBLICATIONS

Moo Nam Ko et al. "social-networks connect services", 2010 IEEE, pp. 37-43.*

(Continued)

*Primary Examiner* — Andy Ho
*Assistant Examiner* — Abdou K Seye
(74) *Attorney, Agent, or Firm* — Schwegman Lundberg & Woessner, P.A.

(57) ABSTRACT

According to various exemplary embodiments, an online content account corresponding to a member of a social network service is identified, the online content account being hosted by an online content hosting service distinct from said social network service. Thereafter, a display is generated, via a user interface in a device, of a prompt that invites the member to bind the online content account with a member profile page associated with the member of the social network service.

11 Claims, 16 Drawing Sheets

(56) References Cited

U.S. PATENT DOCUMENTS

| | | | |
|---|---|---|---|
| 2012/0192258 A1* | 7/2012 | Spencer | H04W 12/06 726/7 |
| 2012/0303703 A1 | 11/2012 | Richter et al. | |
| 2013/0007596 A1 | 1/2013 | Vandermolen et al. | |
| 2013/0031176 A1* | 1/2013 | Shih | G06Q 50/01 709/204 |
| 2013/0031487 A1* | 1/2013 | Olsen | G06Q 50/01 715/751 |
| 2013/0198307 A1* | 8/2013 | Ruetschi | H04L 67/16 709/206 |
| 2014/0033081 A1 | 1/2014 | Fernandez et al. | |
| 2014/0129942 A1 | 5/2014 | Rathod | |
| 2014/0245189 A1 | 8/2014 | Berger et al. | |

OTHER PUBLICATIONS

"U.S. Appl. No. 14/193,220, Final Office Action dated Jul. 28, 2016", 14 pgs.

"U.S. Appl. No. 14/193,220, Non Final Office Action dated Nov. 18, 2015", 14 pgs.

"U.S. Appl. No. 14/193,220, Response filed May 2, 2016 to Non Final Office Action dated Nov. 18, 2015", 11 pgs.

"U.S. Appl. No. 14/193,220, Response filed Dec. 1, 2016 to Final Office Action dated Jul. 28, 2016", 14 pgs.

"U.S. Appl. No. 14/193,220, Non Final Office Action dated May 24, 2017", 14 pgs.

"U.S. Appl. No. 14/193,220, Examiner Interview Summary dated Sep. 14, 2017", 3 pgs.

"U.S. Appl. No. 14/193,220, Response filed Sep. 20, 2017 to Non Final Office Action dated May 24, 2017", 10 pgs.

"U.S. Appl. No. 14/193,220, Final Office Action dated Oct. 13, 2017", 15 pgs.

"Non Final Office Action Issued in U.S. Appl. No. 14/193,220", dated Jun. 15, 2018, 18 Pages.

\* cited by examiner

1200

| Name | Email Address | IP Address | Age | Sex | Location | Phone |
|---|---|---|---|---|---|---|
| Jane Doe | jane.doe@mail.com | 172.16.254.1 | 30 | F | San Francisco | 123-456-7890 |

1201

| Field Type | Position | Entity | Time Period | Skills | Attached media content |
|---|---|---|---|---|---|
| Experience | Computer Programmer | XYZ | December 2011-Present | Java, HTML, C++ | - |
| Education | B.S.E. Computer Science | University of Illinois | 2006-2010 | - | - |

*Fig. 12*

| Member Profile Attribute | Keywords/Synonyms |
|---|---|
| Doctor | doctor, medicine, physician, medical school,... |
| Lawyer | lawyer, law, attorney, esquire, law school,... |
| Computer programmer | computers, programmer, engineer, computer science... |
| Sales representative | sale, representative, marketing, advertising, products,... |

SYSTEMS AND METHODS FOR BINDING ONLINE CONTENT ACCOUNTS

This application claims the priority benefit of U.S. Provisional Application No. 61/770,299, filed Feb. 27, 2013, which is incorporated herein by reference.

TECHNICAL FIELD

The present application relates generally to electronic data and, in one specific example, to systems and methods for binding online content accounts.

BACKGROUND

Online social and professional networking websites are becoming increasingly popular, with many such websites boasting millions of active members. Each member of the networking website is able to upload an editable member profile page to the networking website. The member profile page may include various information about the member, such as the member's biographical information, photographs of the member, and information describing the member's employment history, education history, skills, experience, activities, and the like. Such member profile pages of the networking website are viewable by, for example, other members of the networking website.

BRIEF DESCRIPTION OF THE DRAWINGS

Some embodiments are illustrated by way of example and not limitation in the figures of the accompanying drawings in which:

FIG. 12 illustrates an example of member profile data, according to various embodiments.

FIG. 14 illustrates an example of member profile attribute data, according to various embodiments.

DETAILED DESCRIPTION

Example methods and systems for binding online content accounts are described. In the following description, for purposes of explanation, numerous specific details are set forth in order to provide a thorough understanding of example embodiments. It will be evident, however, to one skilled in the art that the present invention may be practiced without these specific details.

Figure 1:
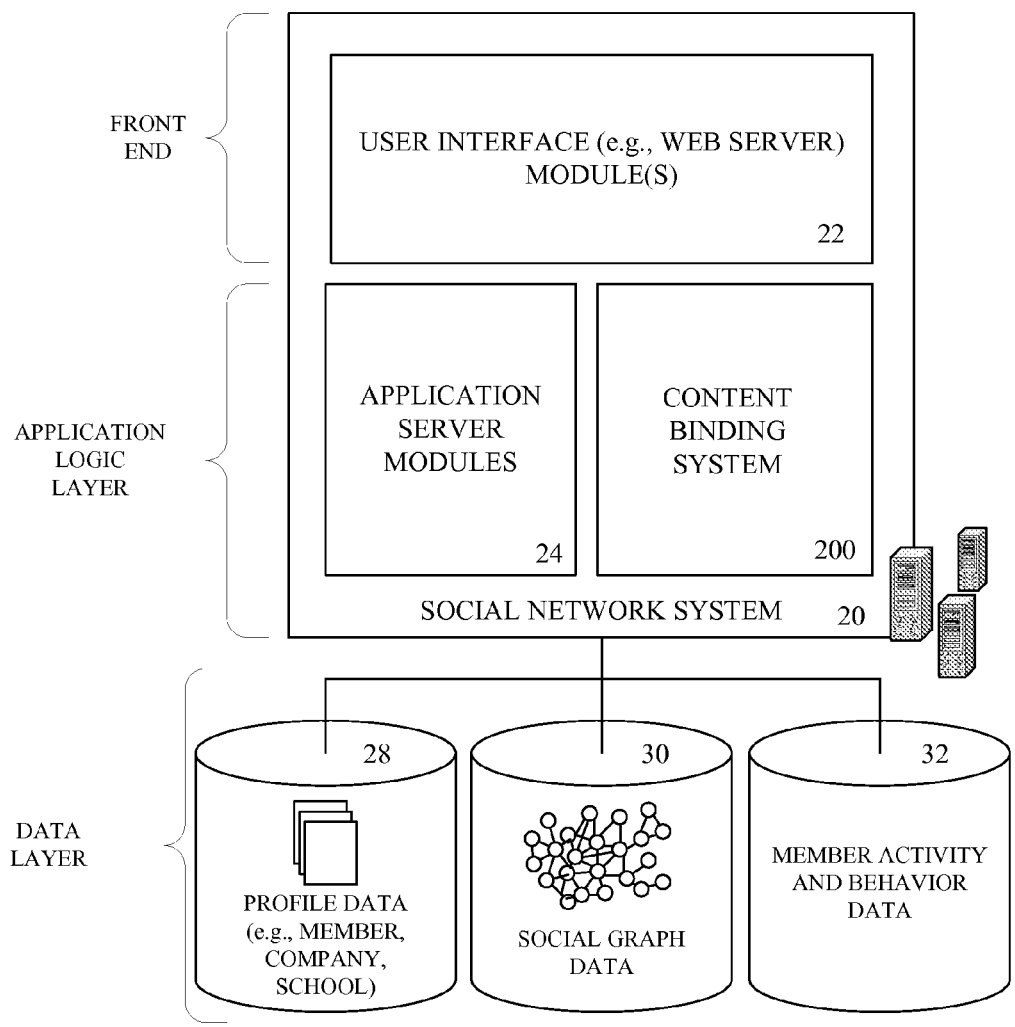
FIG. 1 is a block diagram showing the functional components of a social networking service, consistent with some embodiments of the invention.

FIG. 1 is a block diagram illustrating various components or functional modules of a social network service such as the social network system 20, consistent with some embodiments. As shown in FIG. 1, the front end consists of a user interface module (e.g., a web server) 22, which receives requests from various client-computing devices, and communicates appropriate responses to the requesting client devices. For example, the user interface module(s) 22 may receive requests in the form of Hypertext Transport Protocol (HTTP) requests, or other web-based, application programming interface (API) requests. The application logic layer includes various application server modules 24, which, in conjunction with the user interface module(s) 22, generates various user interfaces (e.g., web pages) with data retrieved from various data sources in the data layer. With some embodiments, individual application server modules 24 are used to implement the functionality associated with various services and features of the social network service. For instance, the ability of an organization to establish a presence in the social graph of the social network service, including the ability to establish a customized web page on behalf of an organization, and to publish messages or status updates on behalf of an organization, may be services implemented in independent application server modules 24. Similarly, a variety of other applications or services that are made available to members of the social network service will be embodied in their own application server modules 24.

As shown in FIG. 1, the data layer includes several databases, such as a database 28 for storing profile data, including both member profile data as well as profile data for various organizations. Consistent with some embodiments, when a person initially registers to become a member of the social network service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database with reference number 28. Similarly, when a representative of an organization initially registers the organization with the social network service, the representative may be prompted to provide certain information about the organization. This information may be stored, for example, in the database with reference number 28, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph, shown in FIG. 1 with reference number 30.

The social network service may provide a broad range of other applications and services that allow members the opportunity to share and receive information, often customized to the interests of the member. For example, with some embodiments, the social network service may include a photo sharing application that allows members to upload and share photos with other members. With some embodiments, members may be able to self-organize into groups, or interest groups, organized around a subject matter or topic of interest. With some embodiments, the social network service may host various job listings providing details of job openings with various organizations.

As members interact with the various applications, services and content made available via the social network service, the members' behavior (e.g., content viewed, links or member-interest buttons selected, etc.) may be monitored and information concerning the member's activities and behavior may be stored, for example, as indicated in FIG. 1 by the database with reference number 32. This information may be used to classify the member as being in various categories. For example, if the member performs frequent searches of job listings, thereby exhibiting behavior indicating that the member is a likely job seeker, this information can be used to classify the member as a job seeker. This classification can then be used as a member profile attribute for purposes of enabling others to target the member for receiving messages or status updates. Accordingly, a company that has available job openings can publish a message that is specifically directed to certain members of the social network service who are job seekers, and thus, more likely to be receptive to recruiting efforts.

With some embodiments, the social network system 20 includes what is generally referred to herein a content binding system 200. The content binding system 200 is described in more detail below in conjunction with FIG. 2.

Although not shown, with some embodiments, the social network system 20 provides an application programming interface (API) module via which third-party applications can access various services and data provided by the social network service. For example, using an API, a third-party application may provide a user interface and logic that enables an authorized representative of an organization to publish messages from a third-party application to a content hosting platform of the social network service that enables facilitates presentation of activity or content streams maintained and presented by the social network service. Such third-party applications may be browser-based applications, or may be operating system-specific. In particular, some third-party applications may reside and execute on one or more mobile devices (e.g., phone, or tablet computing devices) having a mobile operating system.

Figure 2:
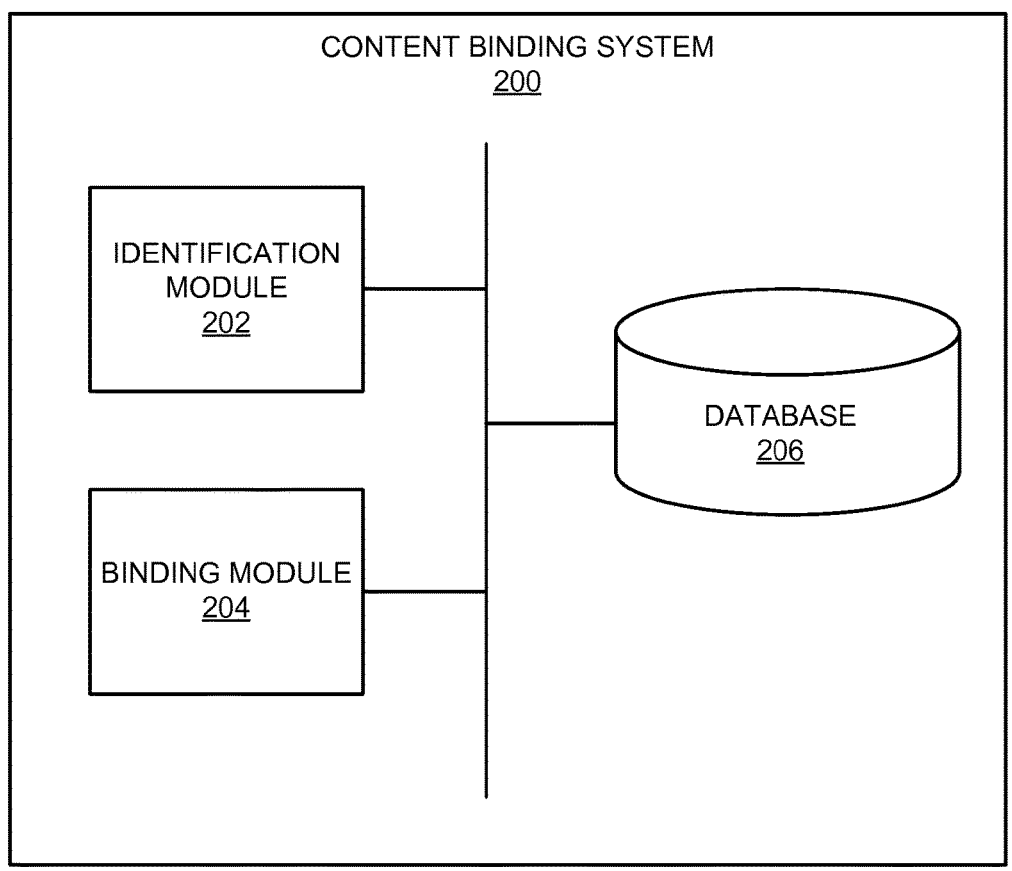
FIG. 2 is a block diagram of an example system, according to various embodiments.

Turning now to FIG. 2, a content binding system 200 includes an identification module 202, a binding module 204, and a database 206. The modules of the content binding system 200 may be implemented on a single device such as a content binding device, or on separate devices interconnected via a network. The aforementioned content binding device may correspond to, for example, a client machine or application server.

According to various embodiments described herein, the content binding system 200 is configured to find online content accounts (e.g., YouTube®, Slideshare®, Pinterest®, Tumblr®, etc.) associated with a member of a social network service (e.g., LinkedIn®), and to prompt the member as to whether they would like to bind these online content accounts with their member profile page (e.g., their LinkedIn® member profile page). Once binded, content from the online content account is periodically fetched and populated into in their member profile page (e.g., their LinkedIn® member profile page).

According to various embodiments, the content binding system 200 may find the online content accounts by accessing member profile attributes of the member (e.g., user name, e-mail address), and crawling or searching for online content accounts having associated owner information (e.g., user name, e-mail address, etc.) that matches the aforementioned member profile attributes.

According to various embodiments, the content binding system 200 may narrow down the list of online content accounts to search for, based on various member profile attributes, such as education or experience. For example, if the member has a particular experience position (e.g., the member is a physician or a lawyer), then the content binding system 200 may search for online content accounts from among a known set of online content hosting services that tend to host online content accounts for users having that same experience position. As another example, if the member has a particular education position (e.g., the member attended a photography school or a physiotherapy school), then the content binding system 200 may search for content accounts from among a known set of online content hosting services that tend to host online content accounts for users having that same education position.

According to various embodiments, the content binding system 200 may explicitly ask the member to identify their other online content accounts, and then bind those online content accounts to their member profile page (e.g., their LinkedIn member profile page).

Figure 3:
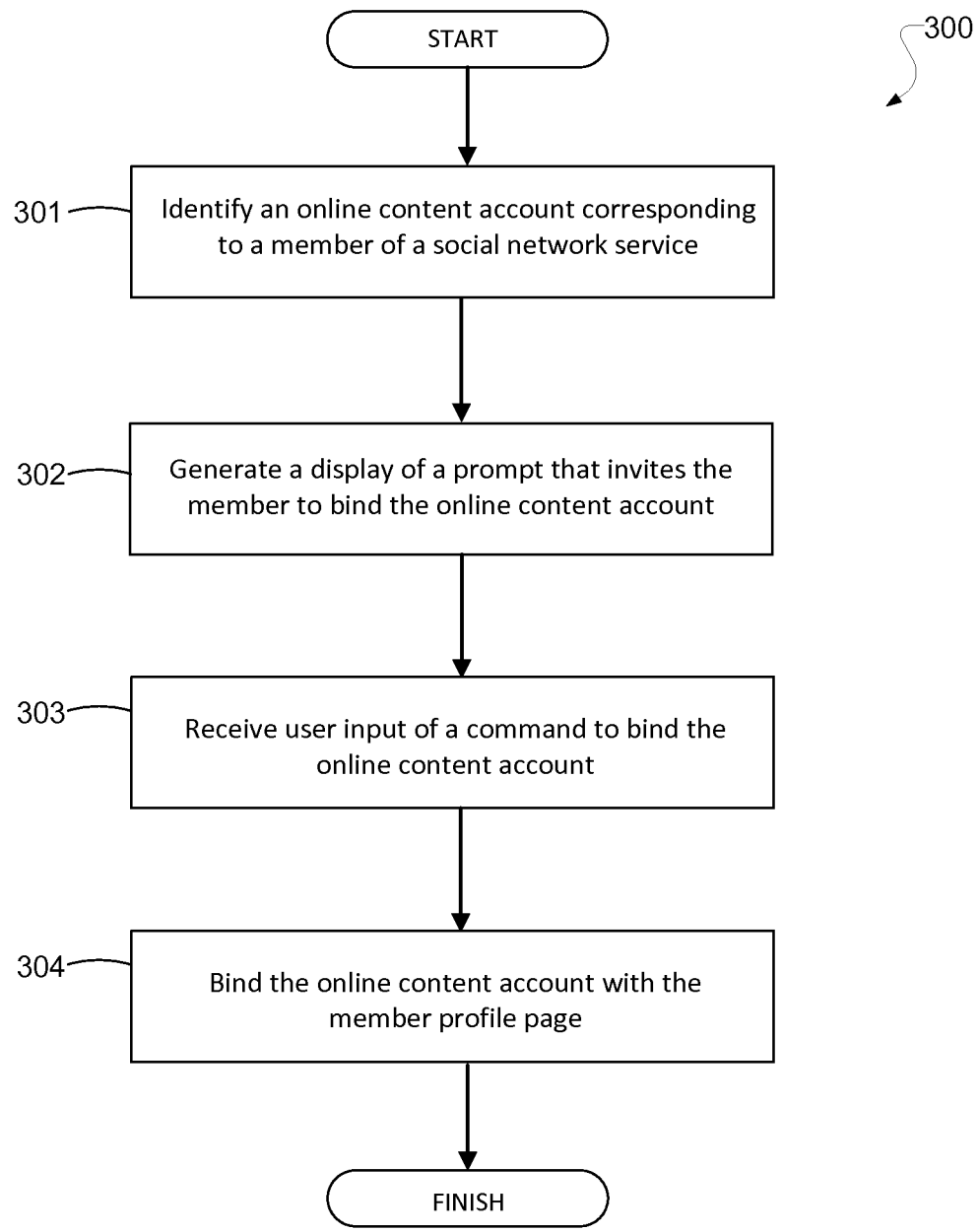
FIG. 3 is a flowchart illustrating an example method, according to various embodiments.

FIG. 3 is a flowchart illustrating an example method 300, according to various embodiments. The method 300 may be performed at least in part by, for example, the content binding system 200 illustrated in FIG. 2 (or an apparatus having similar modules, such as a client machine or application server). In operation 301, the identification module 202 identifies an online content account corresponding to a member of a social network service, the online content account being hosted by an online content hosting service distinct from said social network service. In operation 302, the binding module 204 generates a display, via a user interface in a device, of a prompt that invites the member to bind the online content account with a member profile page associated with the member. In operation 303, the binding module 204 receives user input of a command to bind the online content account with the member profile page. Finally, in operation 304, the binding module 204 binds the online content account with the member profile page. Each of the aforementioned operations 301-304, and each of the aforementioned modules of the content binding system 200, will now be described in greater detail.

Figure 4:
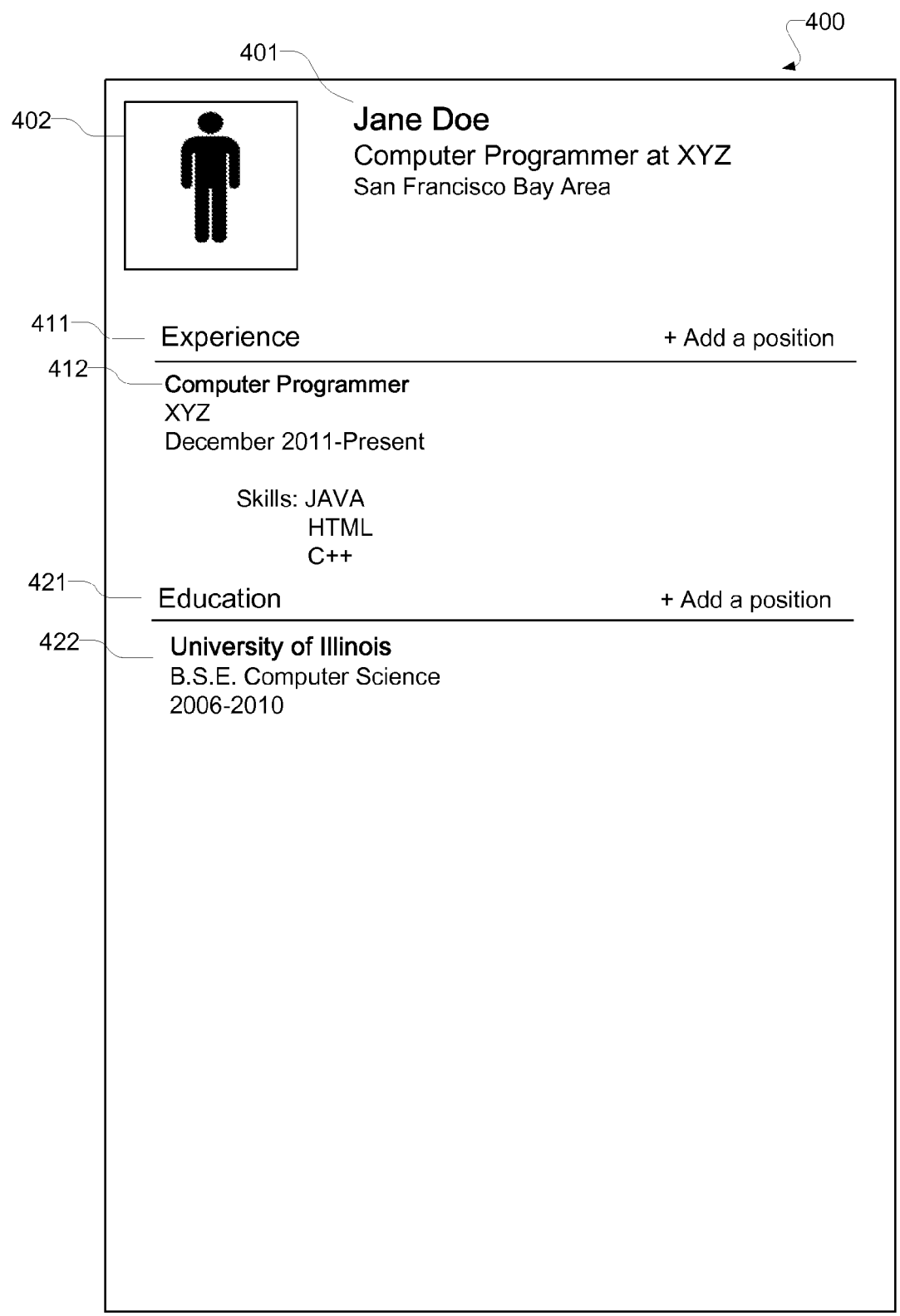
FIG. 4 illustrates an example of a member profile page, according to various exemplary embodiments.

Referring back to FIG. 3, in operation 301, the identification module 202 identifies an online content account corresponding to a member of a social network service. The member of the social network service may be associated with a member profile page hosted by the social network service. An example of a member profile page 400 of a member (e.g., a LinkedIn® page of a member "Jane Doe") is illustrated in FIG. 4. As seen in FIG. 4, the member profile page 400 includes identification information 401, such as the member's name ("Jane Doe"), the member's current employment position ("Computer Programmer at XYZ"), and geographic address/location information ("San Francisco Bay Area"). The member's profile page 400 also includes a photo area 402 for displaying a photograph of the member. Further, the member profile page 400 includes various sections (also known as fields). For example, member profile page 400 includes an experience section 411 including listings of experience positions (e.g., employment/volunteer experience position 412) and skills of the member, and an education section 421 including listings of educational credentials of the member (e.g., university degree or diploma 422 earned or currently being earned by the member).

Note that the member profile page 400 is merely exemplary, and while the member profile page 400 includes certain sections or fields (e.g., experience sections and educations sections), it is apparent that these sections or fields may be supplemented or replaced by other sections or fields (e.g., a general portfolio section/field, an art portfolio section/field, a music portfolio section/field, a photography portfolio section/field, a multimedia section/field, and so forth). Those skilled in the art will understand that a member profile page may include other information, such as various identification information (name, username, email address, geographic address, networks, location, phone number, etc.), education information, employment information, resume information, skills, experience, activities, group membership, images, photos, preferences, news, status, links or URLs on the profile page, and so forth.

The member profile pages of the social network service (e.g., LinkedIn.com) may correspond to member profile web pages hosted by a remote web server associated with the social network service. Such member profile web pages may be accessible through a network (e.g., the Internet) with use of a web browser of a client device that accesses a specific Uniform Resource Locator (URL) reference link corresponding to each member profile web page. For example, when a user of a client device provides the appropriate user commands to a browser application operating on the client device, the browser application transmits a request to the appropriate URL through a network (e.g., the Internet), and the remote web server transmits a response to the browser application of the client device, where the response includes code corresponding to the user profile page (e.g., HTML code, HTML5 code, XHTML code, JavaScript code, etc.). Thereafter, the browser application interprets the received code, and renders the code as a visual webpage that may be displayed by a display unit of the client device (e.g., a display screen or display monitor), so that the member profile web page may be viewed by the user of the client device. Such aspects of a browser application accessing web pages hosted by remote web servers through a network are understood by those skilled in the art, and hence shall not be described in further detail in the interests of brevity.

Referring back to operation 301 in FIG. 3, the identification module 202 is configured to identify an online content account corresponding to a member of a social network service. As described herein, an online content accounts refers to any online account, webpage, blog, etc., configured to host or display content for viewing by others. Online content accounts display content in the form of a "feed" or "stream", where content may be displayed in chronological order (with the most recent content being displayed at the top of the feed). Non-limiting examples of content posted on online content accounts includes text content, image content, video content, audio content, and slideshow content. The online content account may be hosted by an online content hosting service which may be distinct from the aforementioned social network service. Non-limiting examples of online content hosting services that host online content accounts include: SlideShare®, YouTube®, Vimeo®, Scribd®, Facebook®, Twitter®, Tumblr®, Instagram®, Flickr®, Google® Docs, Google® Picasa, Dropbox®, Wordpress®, Skydrive®, Box®, Behance®, Pinterest®, Movable Type®, TypePad®, Blogger®, SoundCloud®, Posterous®, SmugMug®, SquareSpace®, Github®, Evernote®, LinkedIn® Answers, Quora®, StackOverflow®, About.me, MySpace®, Dribbble®, and so on. Many of the aforementioned online content accounts display content in the form of a "feed", where content is displayed in chronological order (with the most recent content being displayed at the top of the feed).

Figure 5:
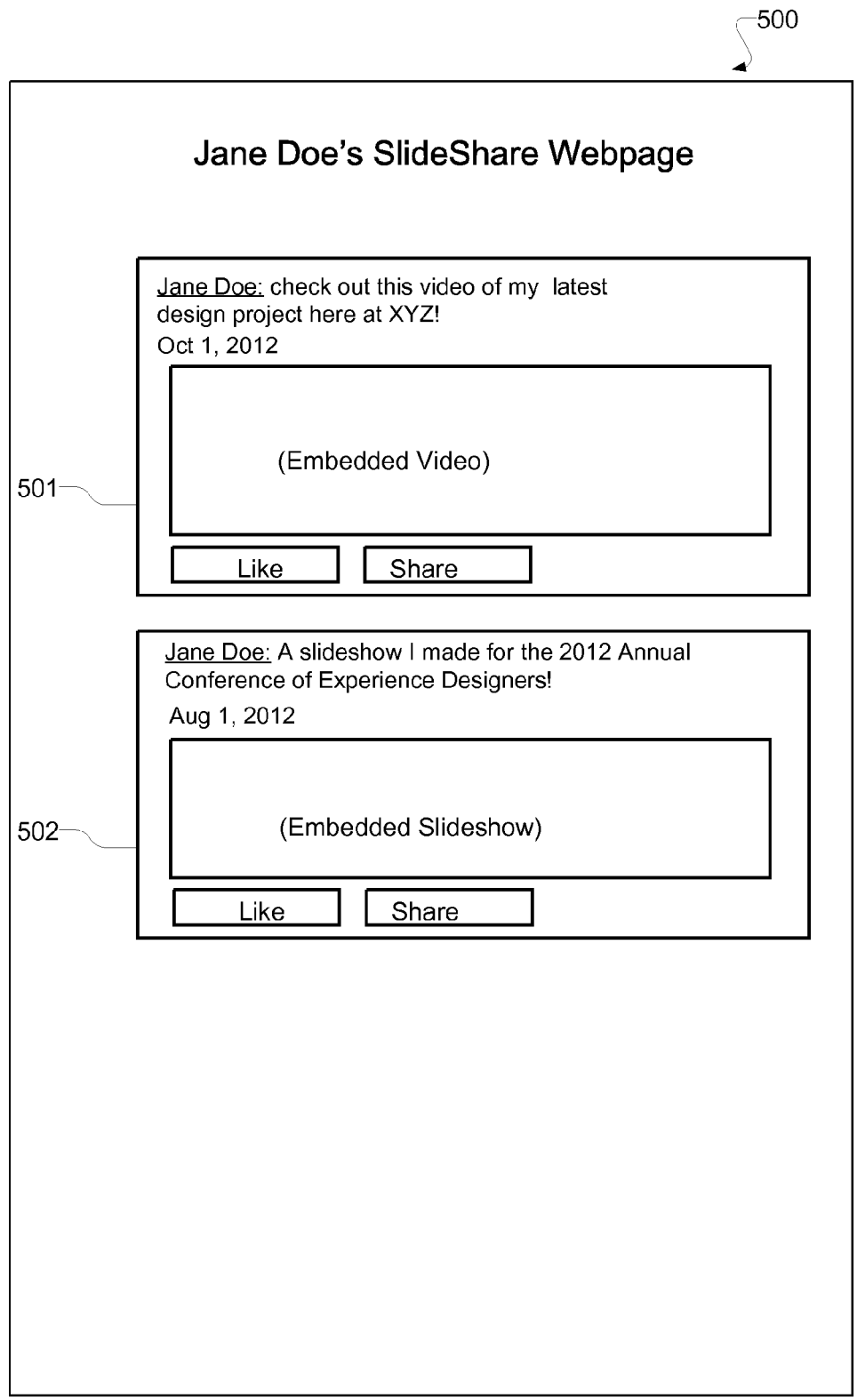
FIG. 5 illustrates an example of an online content account, according to various embodiments.

FIG. 5 illustrates an example of an online content account 500 associated with the member Jane Doe, the same member associated with the member profile page 400 illustrated in FIG. 4. More specifically, FIG. 5 illustrates an example of the online content account 500 in the form of a webpage accessible via a particular reference link (e.g., a particular uniform resource locator or URL). For example, the online content account 500 may correspond to, for example, a SlideShare page of the member Jane Doe. The online content account 500 includes content items 501 and 502. The content item 501 corresponds to an embedded video that was uploaded to the webpage 500 on Oct. 1, 2012. Further, the content item 502 corresponds to an embedded slideshow that was uploaded to the webpage 500 on Aug. 1, 2012.

According to various embodiments, the content binding system 200 is configured to find online content accounts (e.g., the online content account 500 in FIG. 5) associated with a member of the social network service (e.g., the member Jane Doe, see FIG. 4), by using member profile attributes of the member (e.g., user name, e-mail address, etc.) and crawling or searching for online content accounts having associated owner information (e.g., user name, e-mail address, etc.) that matches the aforementioned member profile attributes.

For example, as illustrated in FIG. 4, the member profile page 400 associated with the member Jane Doe identifies the name of the member as Jane Doe. Although not illustrated in FIG. 4, the member profile page 400 may also identify the e-mail address of the member Jane Doe. Thus, the identification module 202 may identify the appropriate online content accounts, such as online content account 500 illustrated in FIG. 5, by crawling a network (such as the Internet) for online content accounts associated with the name Jane Doe. For example, the identification module 202 may access a list of all known online content accounts and/or online content hosting services accessible via a network (such as the Internet). Thereafter, the identification module 202 may crawl through webpages associated with these online content accounts and/or online content hosting services, searching for any of the webpages associated with a particular member name or email address. For instance, the identification module 202 may examine the HTML code associated with each of the webpages, in order to determine if any of these webpages include HTML code associated with data or metadata corresponding to the name or email address of the member Jane Doe.

As described above, the identification module 202 may crawl through all the data, metadata, and information associated with the known online content accounts and/or online content hosting services. If the content binding system 200 has an appropriate access agreement with various online content hosting services, the content binding system 200 may also crawl through all the data, metadata or information associated with private online content account webpages of the users of the online content hosting services. The identification module 202 can access the online content hosting services to access identity information or user profile information regarding the registered users of the online content hosting services from information available in registered user profiles. Any publically available social media identity information regarding the members may be obtained from other social media or online sources as well, which may then be utilized to identify online content accounts associated which such social media identify information. Online content hosting services may expose identity information in some sort of application programming interface (API) that is accessible by the identification module 202. Thus, the identification module 202 may retrieve user profile information of the online content account webpages from application programming interfaces (APIs) that are exposed by the respective online content hosting services.

Referring back to FIG. 3, after the identification module 202 identifies an online content account (e.g., online content account 500 illustrated in FIG. 5) corresponding to a member of a social network service (e.g., the member Jane Doe illustrated in FIG. 4) in operation 301, then, in operation 302, the binding module 204 generates a display of a prompt that invites the member to bind the online content account identified in operation 301 with the member profile page associated with the member. The prompt may be displayed via a user interface in a device, such as a mobile device (e.g., smart phone, tablet, etc.) associated with the member.

Figure 6:
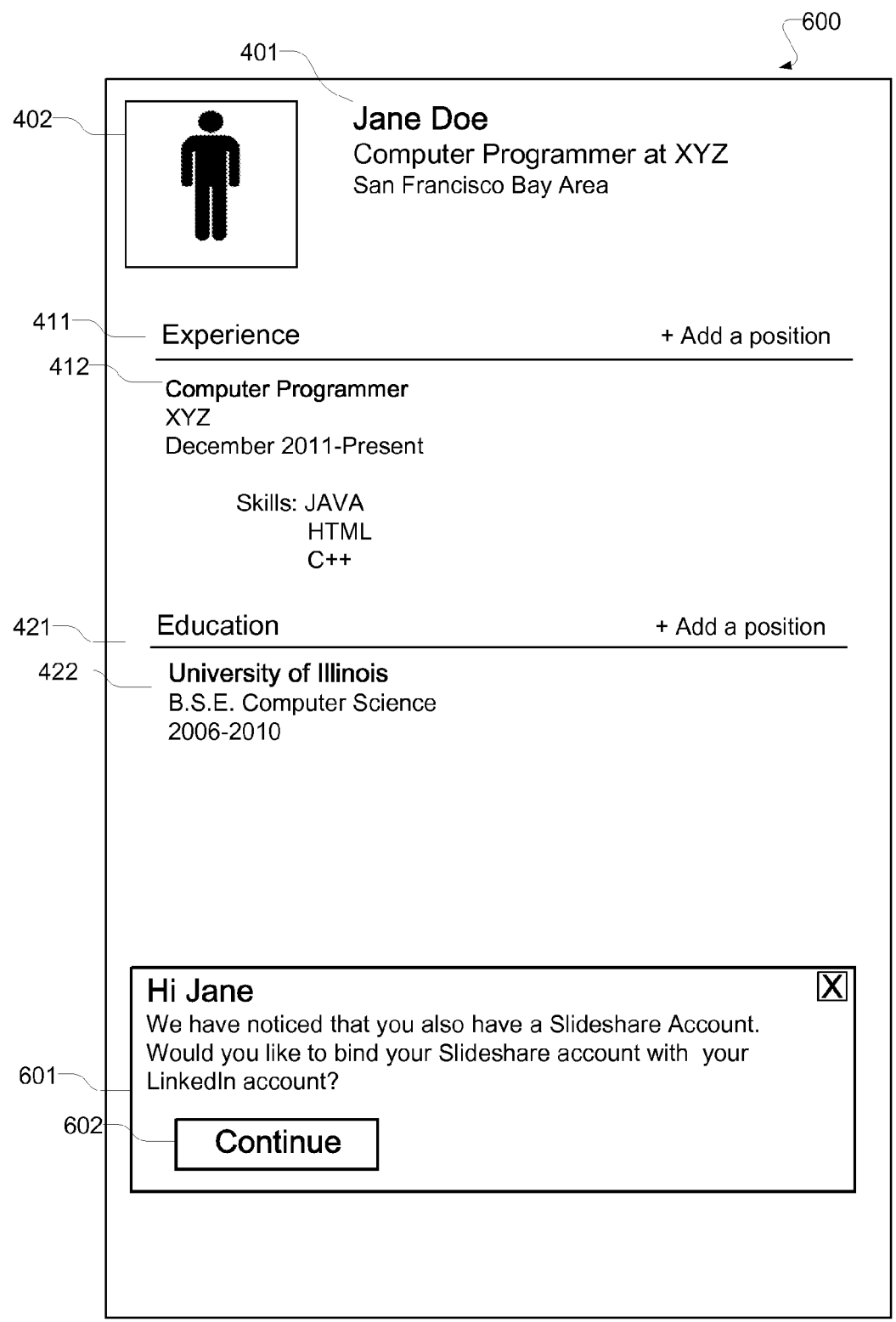
FIG. 6 illustrates an example of a prompt superimposed over a member profile page, according to various embodiments.

FIG. 6 illustrates a member profile page 600 substantially similar to the member profile page 400 of the user Jane Doe illustrated in FIG. 4. As illustrated in FIG. 6, the prompt 601 is displayed and superimposed by the binding module 204 over the member profile page 600. The prompt 601 invites the member Jane Doe to bind an identified online content account (e.g., the online content account 500 illustrated in FIG. 5) with their member profile page 600.

While the prompt 601 illustrated in FIG. 6 is superimposed over the member profile page 600 of the member, it is apparent that the prompt 601 may be communicated to the member in other ways. For example, the prompt 601 may be transmitted to the member Jane Doe in the form of an e-mail, text message (e.g., a Short Message Service or SMS text message, or a Multimedia Messaging Service or MMS text message), an instant message, chat request, and so on.

Referring back to FIG. 3, in operation 303, the binding module 204 receives user input of a command to bind the online content account with the member profile page. For example, the binding module 204 may detect that the member Jane Doe has selected the "Continue" button 602 in the prompt 601 illustrated in FIG. 6. Although not illustrated, after the member selects the continue button 602, the binding module 204 may request the member to enter various authentication information (e.g., username, password, etc.) associated with the identified online content account(s).

Finally, in operation 304, the binding module 204 binds the online content account with the member profile page of the member. For example, the binding module 204 may bind the online content account 500 illustrated in FIG. 5 with the member profile page 400 of the user Jane Doe illustrated in FIG. 4. The binding process may include fetching content from the online content account and populating this content into the member profile page of the user. In some embodiments, the binding described here may include the storing of credentials provided in operation 303 or the storing of authentication tokens (e.g., an oAuth/openID token) that were granted to the system 200 (or associated social network service) on behalf of the member when the command was issued in operation 303. Such credentials or tokens may be stored in a database (e.g., database 200 in FIG. 2) and may be utilized by the system 200 for future access to that site to extract further content, as described in more detail below. In some embodiments, after the member profile page is bound to the online content account, the system 200 may perform either a one-time content retrieval of content from the online content account, or an on-going sync of content from the online content account, based on the authentication information, credentials or tokens received via the system (e.g., in step 303 in FIG. 3).

As described above, after the member selects the continue button 602 in FIG. 6, the binding module 204 may request the member to enter various authentication information (e.g., username, password, etc.) associated with the identified online content account(s). The binding module 204 may utilize this authentication information to automatically access and fetch the content by crawling through all the data, metadata, and information associated with the online content account of the member. If the content binding system 200 has an appropriate access agreement with various online content hosting services, the content binding system 200 may also crawl through all the data, metadata or information associated with private online content account webpages of the users of the online content hosting services. Online content hosting services may expose content in the online content account web pages via some sort of application programming interface (API) that is accessible by the binding module 204. Thus, the binding module 204 may retrieve the content of the online content account webpages from application programming interfaces (APIs) that are exposed by the respective online content hosting services.

Figure 7:
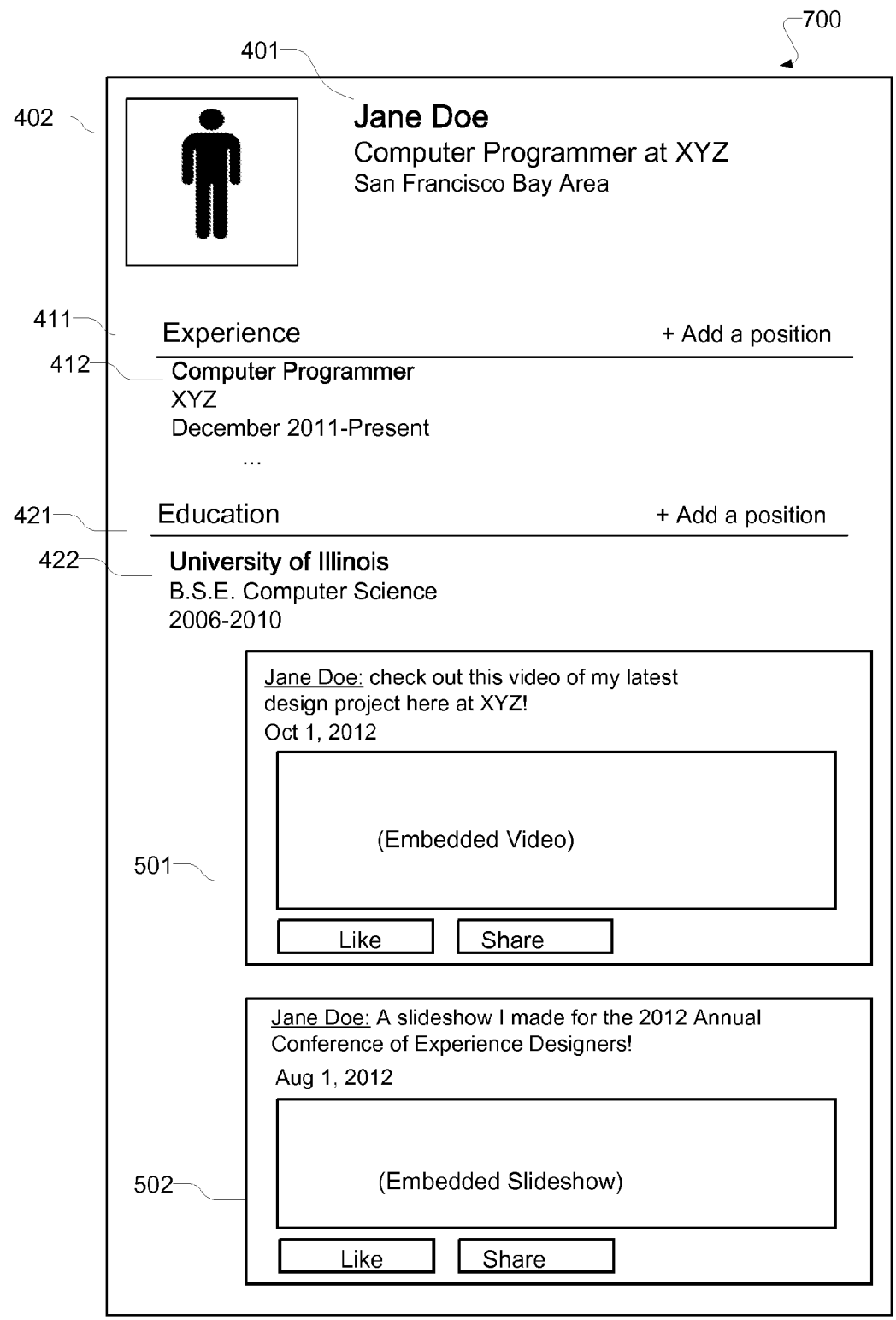
FIG. 7 illustrates an example of a member profile page binded to an online content account, according to various embodiments.

FIG. 7 illustrates a member profile page 700 substantially similar to the member profile page 400 of the user Jane Doe illustrated in FIG. 4. As illustrated in FIG. 7, the content items 501 and 502 from the online content account 500 of the member Jane Doe have been included in the member profile page 700 of the member Jane Doe.

According to various exemplary embodiments, the binding process may result in the binding of an online content account to a member profile page for a predetermined time period (e.g., one month, one year, etc.) or an indefinite time. While the online content account is blinded to the member profile page, the binding module 204 may be configured to periodically access the online content account (e.g., once a minute, once an hour, once a day, once a week, etc.), fetch any content posted on the online content account, and include such content in the member profile page of the user. In this way, any content posted on the member's online content account may be automatically populated into the member's profile page, without any action on the part of the member. Alternatively, a user may specific that only a one-time sync of content from the online content account is to occur. The system 200 may display a user interface allowing a member to specify the aforementioned settings (e.g., specify the length of the binding, specify the periodic fetching interval, specify one-time sync at a given time, etc.). With respect to syncing, the member may choose to automatically update their profile without any action (as described above), or the member may choose to be notified by the system 200 when new content becomes available (e.g., via a prompt displayed in a webpage or mobile application, or a notification message or email, etc.), and the member can choose the particular content that they wish to include in their profile. Accordingly, the member can curate the content on their profiles and update their profiles based only the desired content that they want to display. In some embodiments, the system 200 may include staging database that maintains information describing content updates (e.g., associated with online content accounts discovered by the system 200, as described herein) that have not been acted upon in the context of curating a member's profile. Thus, when a member logs into a website or online social network service associated with the system 200, the system 200 may notify the member of the new content updates, as described above.

Figure 8:
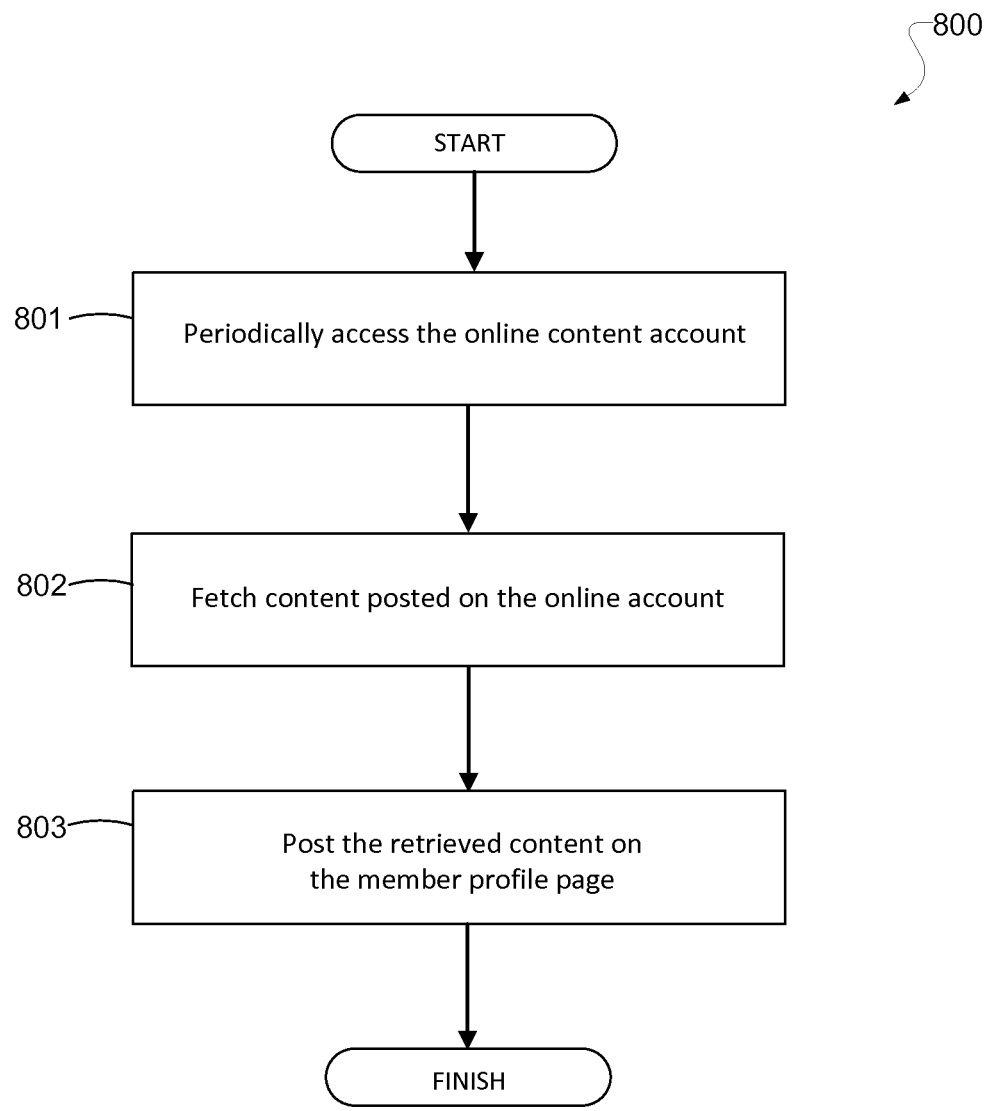
FIG. 8 is a flowchart illustrating an example method, according to various embodiments.
Figure 9:
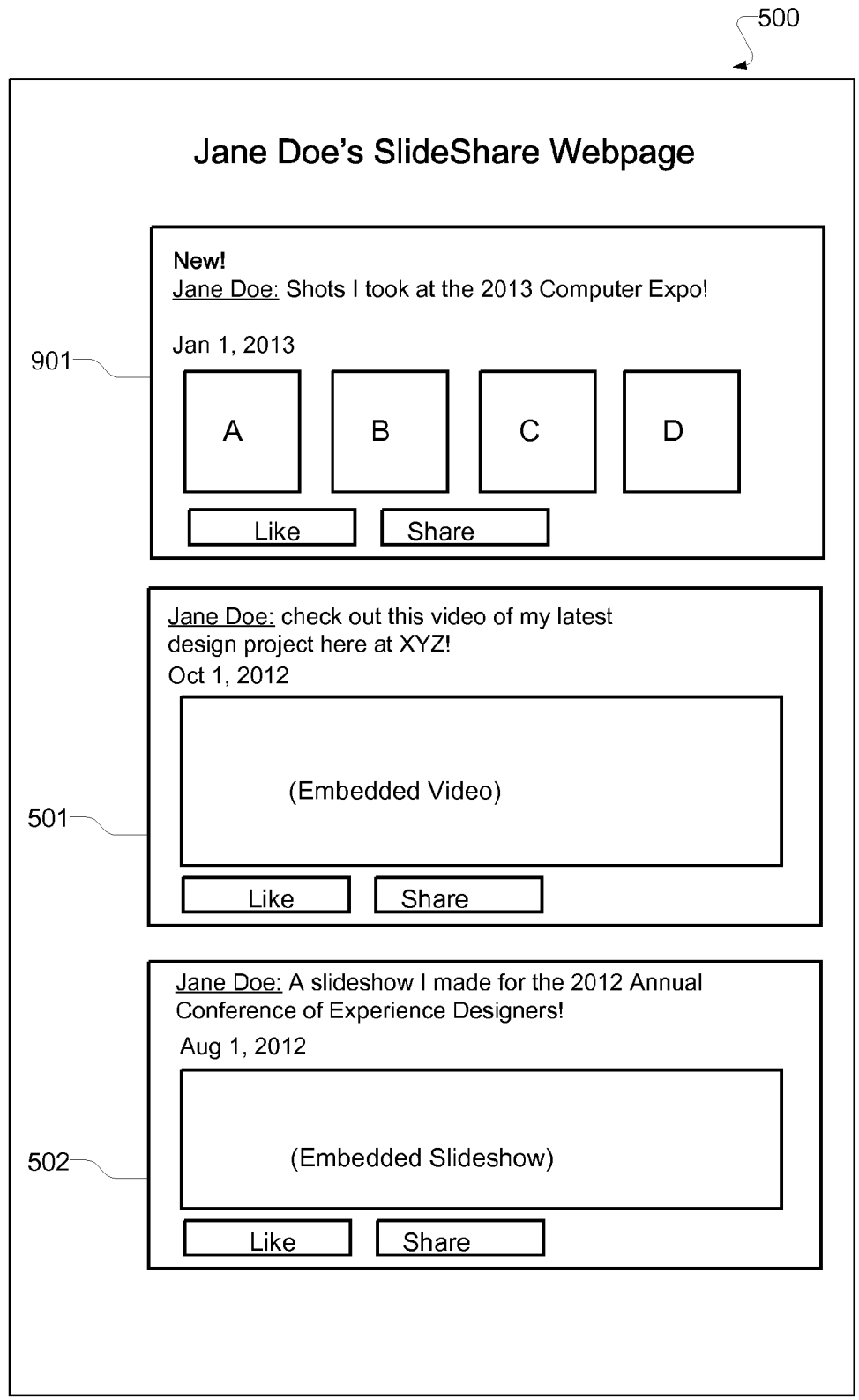
FIG. 9 illustrates an example of an online content account, according to various embodiments.
Figure 10:
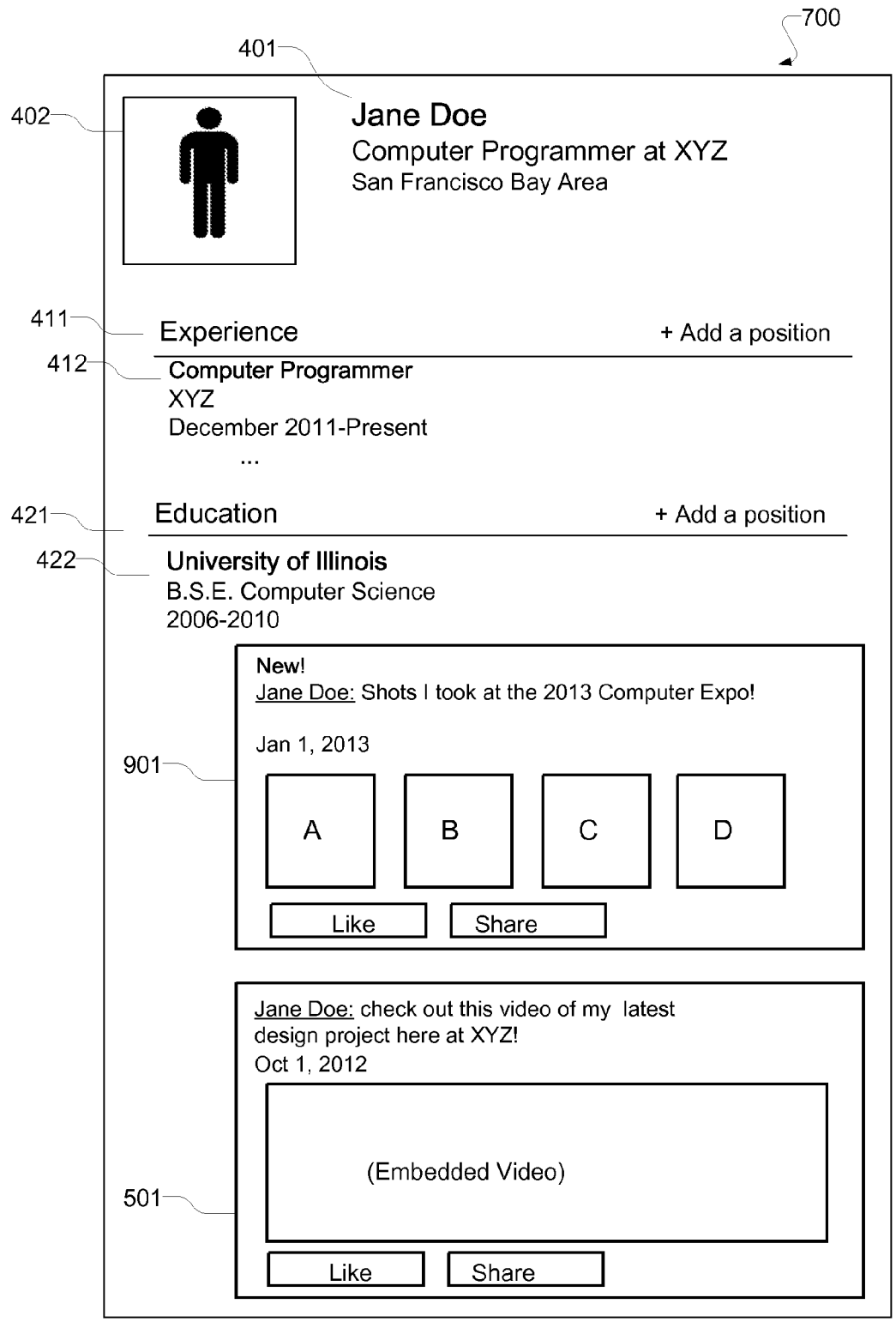
FIG. 10 illustrates an example of a member profile page binded to an online content account, according to various embodiments.

FIG. 8 is a flowchart illustrating an example method 800, according to various embodiments. The method 800 may be performed at least in part by, for example, the content binding system 200 illustrated in FIG. 2 (or an apparatus having similar modules, such as a client machine or application server). In operation 801, the binding module 204 periodically accesses an online content account. For example, suppose the content items 501 and 502 of the online content account 500 have already been populated into the member profile page 700, as illustrated in FIG. 7. FIG. 9 illustrates online content account 500 at a later time, where a more recent content item 901 has just been posted up on the online content account 500. Thus, as a result of the periodic access in operation 801, the binding module 204 will detect the new content icon 901 posted on the online content account webpage 500. In operation 802 in FIG. 8, the binding module 204 fetches content posted on the online account. For example, with reference to FIG. 9, the binding module 204 may fetch the new content item 901 posted on the online content account webpage 500. In operation 803 in FIG. 8, the binding module 204 posts the retrieved content on the member profile page. For example, FIG. 10 illustrates a member profile page 1000 of the user Jane Doe, which is substantially similar to the member profile page 400 of the user Jane Doe illustrated in FIG. 4. As illustrated in FIG. 10, the new content item 901 has been posted on the member profile page 1000.

As described above, in various exemplary embodiments, the content binding system 200 is configured to find the online content accounts (e.g., the online content account 500 in FIG. 5) associated with a member of the social network service (e.g., the member Jane Doe, see FIG. 4), by using member profile attributes of the member (e.g., user name, e-mail address) and searching or crawling for online content accounts with associated owner information (e.g., user name, e-mail address, etc.) that matches the aforementioned member profile attributes.

Figure 11:
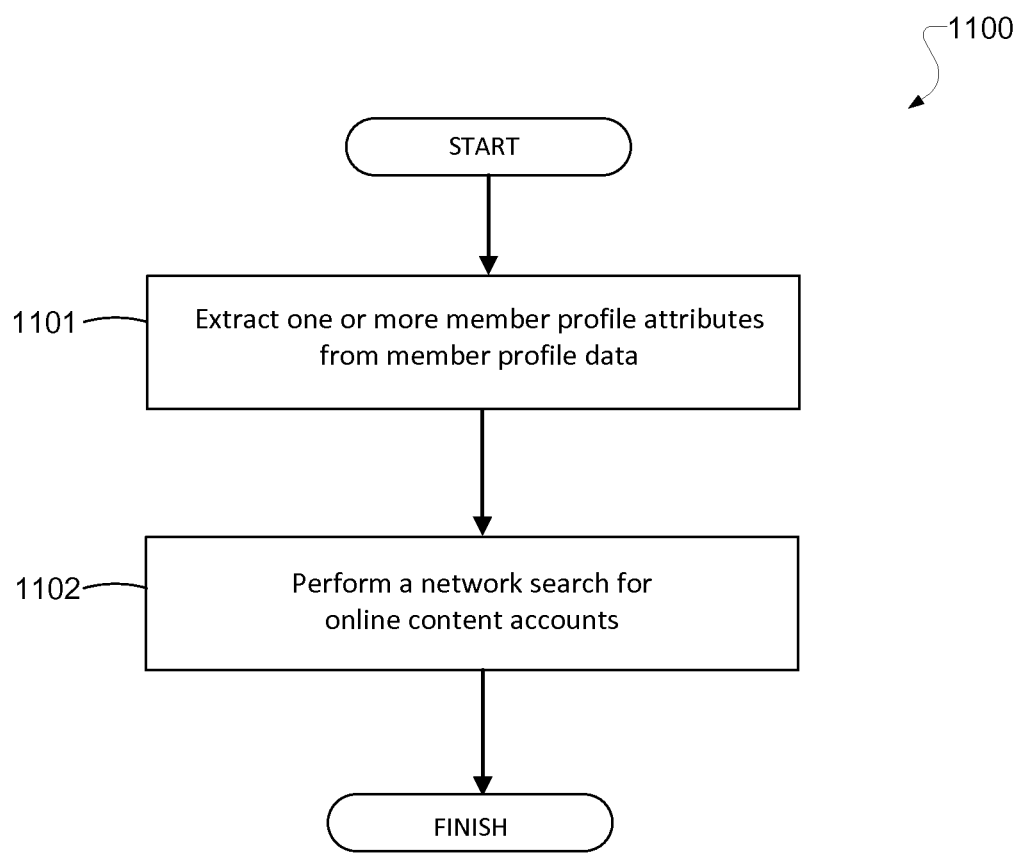
FIG. 11 is a flowchart illustrating an example method, according to various embodiments.

For example, FIG. 11 is a flowchart illustrating an example method 1100, according to various embodiments. The method 1100 may be performed at least in part by, for example, the content binding system 200 illustrated in FIG. 2 (or an apparatus having similar modules, such as a client machine or application server). In operation 1101, the identification module 202 extracts one or more member profile attributes from member profile data associated with the member of the social network service. For example, FIG. 12 illustrates a member profile data 1200 and 1201 corresponding to the information included in the member profile page 400 of the user Jane Doe (see FIG. 4). The member profile data 1200 and 1201 may be stored in, for example, the database 206 illustrated in FIG. 2. The member profile data 1200 includes, for example, name, e-mail address, IP address, age, sex, location, phone, experience positions, education positions, skills, etc. The member profile data for a member may include more information than is included in the corresponding member profile page, since the member profile page displays information for public viewing, whereas the member profile data includes all public and private information associated with the account of that member (e.g., information supplied by the member when the member signed up for the account). Thus, in operation 1101 in FIG. 11, the identification module 202 may extract various member profile attributes, such as name or e-mail address, from the member profile data of the member Jane Doe.

In operation 1102 in FIG. 11, the identification module 202 performs a network search for online content accounts associated with account owner attributes that match the extracted member profile attributes. For example, the identification module 202 may crawl a network (such as the Internet) for online content accounts associated with the name or email address of member Jane Doe. For example, according to various embodiments the identification module 202 may access a list of all known online content accounts and/or online content hosting services accessible via a network (such as the Internet). Thereafter, the identification module 202 may crawl through webpages associated with these online content accounts and/or online content hosting services, searching for any of the webpages associated with a particular member name or e-mail address. For instance, the identification module 202 may examine the HTML code associated with each of the webpages, in order to determine if any of the webpages include HTML code associated with data or metadata corresponding to the name or e-mail address of the member Jane Doe (which was extracted in operation 1101).

According to various embodiments, the content binding system 200 may narrow down the list of online content accounts to search for, based on various member profile attributes, such as education or experience. For example, if the member has a particular experience position (e.g., the member is a physician or a lawyer), then the content binding system 200 may search for content accounts from among a known set of online content hosting services that tend to host online content accounts for users having that same experience position or similar experience positions. As another example, if the member has a particular education position (e.g., the member attended a photography school or a physiotherapy school), then the content binding system 200 may search for content accounts from among a known set of online content hosting services that tend to host online content accounts for users having that same education position or similar education positions. As another example, if the member has a particular skill (e.g., computer programming, JAVA, HTML, etc.), then the content binding system 200 may search for content accounts from among a known set of online content hosting services that tend to host online content accounts for users having the same or similar skills.

Figure 13:
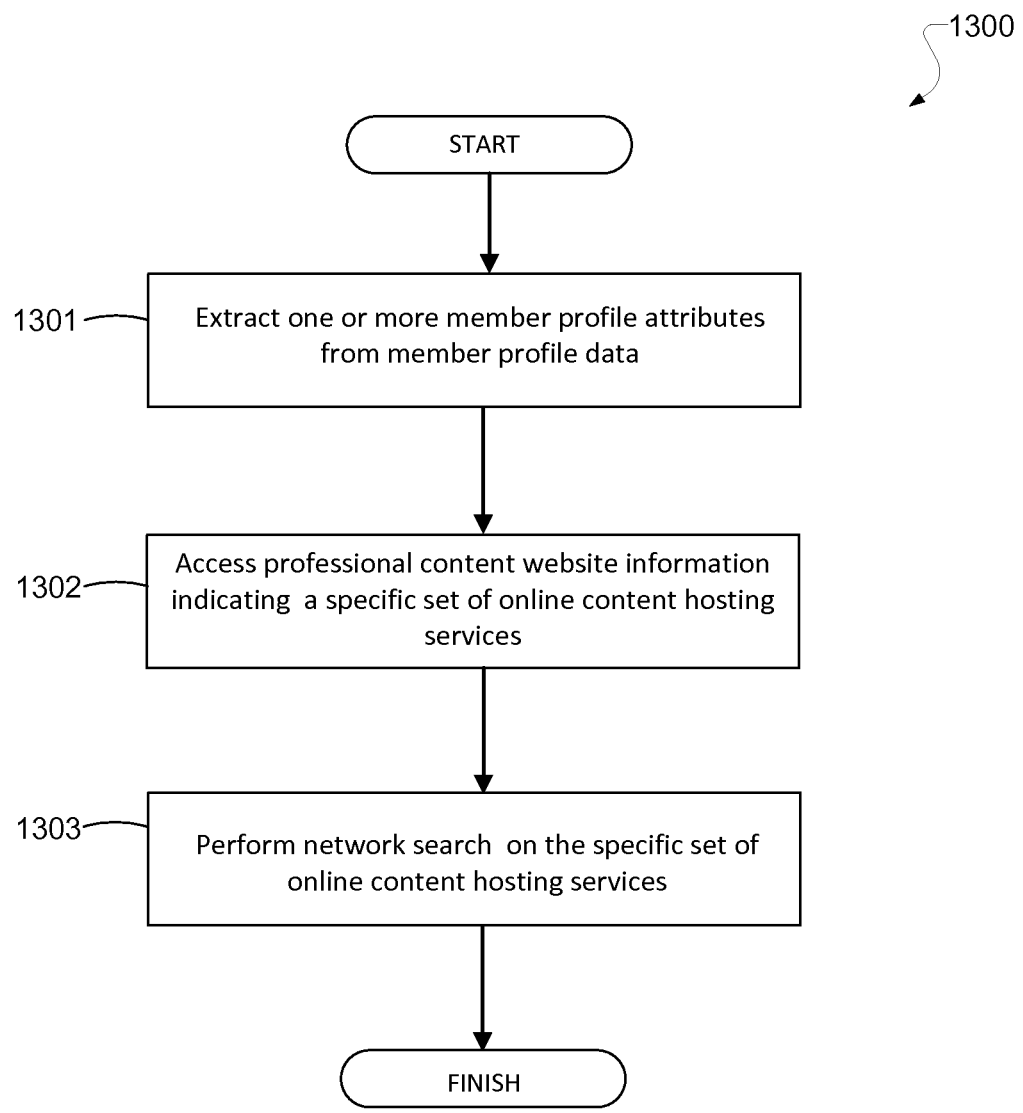
FIG. 13 is a flowchart illustrating an example method, according to various embodiments.

For example, FIG. 13 is a flowchart illustrating an example method 1300, according to various embodiments. The method 1300 may be performed at least in part by, for example, the content binding system 200 illustrated in FIG. 2 (or an apparatus having similar modules, such as a client machine or application server). Operation 1301 is similar to operation 1101 in FIG. 11. For example, in operation 1301, the identification module 202 extracts one or more member profile attributes from member profile data associated with the member of the social network service. Examples of member profile attributes include name, e-mail address, IP address, age, sex, location, phone, experience positions, education positions, skills, etc.

In operation 1302, the identification module 202 accesses content hosting service information indicating that a specific set of online content hosting services are associated with a specific one of the member profile attributes. For example, the specific member profile attribute may correspond to a professional experience position, an education position, a skill, etc. For example, with reference to the member profile data 1201 illustrated in FIG. 12, the identification module 202 will determine that the member Jane Doe has an experience position as a "computer programmer". (FIG. 14 illustrates member profile attribute information indicating synonyms or keywords that may be included in the member profile data that may correspond to a standard member profile attribute, such as an experience position of "computer programmer"). Based on this member profile attribute of experience position or education position, the identification module 202 may consult content hosting service information 1500 illustrated in FIG. 15, which identifies, for each of a number of member profile attributes (such a skill, an education position, or an experience position such as doctor, lawyer, computer programmer, etc.), a number of known online content hosting services. For example, for the member profile attribute "computer programmer", the known online content hosting services may correspond to www.twitter.com, www.Pinterest.com, etc.

In operation 1303 in FIG. 13, the identification module 202 performs a network search for online content accounts associated with account owner attributes that match the extracted member profile attributes, where the search is performed on the specific set of online content hosting services identified in the operation 1302. For example, the identification module 202 may crawl the specific set of online content hosting services identified in operation 1302 for online content accounts associated with the name or e-mail of the member. For instance, the identification module 202 may examine the HTML code associated with each of the webpages associated with the specific set of online content hosting services, in order to determine if any of the webpages include HTML code associated with data or metadata corresponding to the name or e-mail address of the member Jane Doe (which was extracted in operation 1301).

Figure 15:
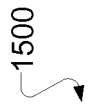
FIG. 15 illustrates an example of content hosting service information, according to various exemplary embodiments.

In some embodiments, the content hosting service information 1500 in FIG. 15 may be generated by the content binding system 200 based on statistical machine learning techniques. For example, as described above, the content binding system 200 may crawl a network for online content accounts associated with members of a social network service. By discovering online content accounts associated with particular members, and by analyzing the member profile attributes of these particular members, the content binding system may detect statistical trends, such as certain online content hosting services tending to be associated with members having particular member profile attributes, or vice versa. For example, the content binding system 200 may use statistical machine learning techniques to determine that, for example, a statistically significant portion of members having education position "B.A. in Music" tend to have an online content account at hosting service SoundCloud®, and a statistically significant portion of members having experience position "graphic artist" tend to have an online content account at hosting service Tumblr®, and a statistically significant portion of members have a skill "video editing" tend to have an online content account from hosting service Vimeo®, and so on. The content binding system 200 may then utilize this information to generate the aforementioned content hosting service information 1500 in FIG. 15.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 16:
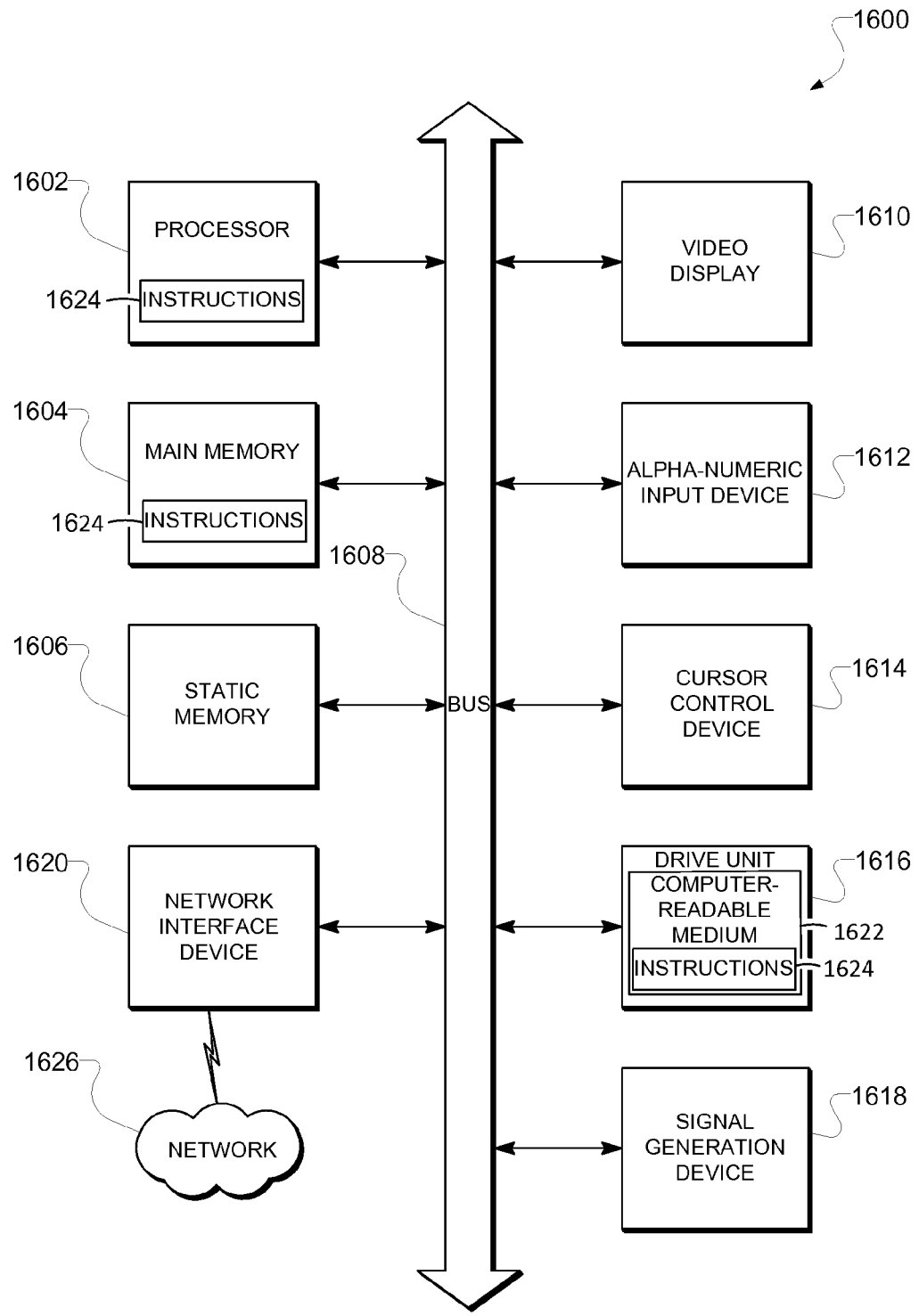
FIG. 16 is a diagrammatic representation of a machine in the example form of a computer system within which a set of instructions, for causing the machine to perform any one or more of the methodologies discussed herein, may be executed.

FIG. 16 is a block diagram of machine in the example form of a computer system 1600 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processor 1602 (e.g., a central processing unit (CPU), a graphics processing unit (GPU) or both), a main memory 1604 and a static memory 1606, which communicate with each other via a bus 1608. The computer system 1600 may further include a video display unit 1610 (e.g., a liquid crystal display (LCD) or a cathode ray tube (CRT)). The computer system 1600 also includes an alphanumeric input device 1612 (e.g., a keyboard or a touch-sensitive display screen), a user interface (UI) navigation device 1614 (e.g., a mouse), a disk drive unit 1616, a signal generation device 1618 (e.g., a speaker) and a network interface device 1620.

Machine-Readable Medium

The disk drive unit 1616 includes a machine-readable medium 1622 on which is stored one or more sets of instructions and data structures (e.g., software) 1624 embodying or utilized by any one or more of the methodologies or functions described herein. The instructions 1624 may also reside, completely or at least partially, within the main memory 1604 and/or within the processor 1602 during execution thereof by the computer system 1600, the main memory 1604 and the processor 1602 also constituting machine-readable media.

While the machine-readable medium 1622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1624 may further be transmitted or received over a communications network 1626 using a transmission medium. The instructions 1624 may be transmitted using the network interface device 1620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
    extracting one or more member profile attributes from member profile data associated with a member of a social network service;
    performing a network search for online content accounts associated with account owner attributes that match the extracted member profile attributes, wherein a scope of the network search is based on accessing content hosting service information indicating that a specific set of online content hosting services to be searched are associated with at least one of the member profile attributes, the at least one member profile attribute corresponding to a professional experience position, an education position, or a skill;
    identifying, by a machine having a memory and at least one processor, an online content account corresponding to the member of the social network service based on the network search, the online content account being hosted by an online content hosting service from the specific set and distinct from said social network service, wherein the online content account is identified from the online content accounts based on member profile attributes of the member; and
    causing display, via a user interface in a device, of a prompt superimposed over a member profile page associated with the member of the social network service, the prompt providing the member with an option to bind the online content account with the member profile page;
    upon receiving a command to bind the online content account with the member profile page, periodically accessing the online content account;
    retrieving content posted by the online content account from the online content hosting service using the online content account bound with the member profile page, wherein the content was posted using the online content account bound with the member profile page; and periodically updating the member profile page by posting the content retrieved from the content hosting service, using the online content account bound with the member profile page, to the member profile page, wherein the member profile page corresponds to a member profile webpage hosted by a webserver of the social network service.

2. The method of claim 1, further comprising:
receiving user input of a command to bind the online content account with the member profile page, the command including a specification of user credential information or authentication token information; and
binding the online content account with the member profile page, wherein the binding comprises:
storing the user credential information or authentication token information in a database; and
accessing content from the online content account, based on the stored user credential information or authentication token information.

3. The method of claim 1, wherein the content posted on the online content account corresponds to at least one of text content, image content, video content, audio content, and slideshow content.

4. The method of claim 1, wherein the member profile attributes include at least one of:
a name of the member;
an email address of the member;
a professional experience position of the member;
an education position of the member;
a skill of the member; and
a location of the member.

5. A system comprising:
at least one processor; and
memory including instructions that, when executed by the at least one processor, cause the at least one processor to perform operations to:
extract one or more member profile attributes from member profile data associated with a member of a social network service;
perform a network search for online content accounts associated with account owner attributes that match the extracted member profile attributes, wherein a scope of the network search is based on accessing content hosting service information indicating that a specific set of online content hosting services to be searched are associated with at least one of the member profile attributes, the at least one member profile attribute corresponding to a professional experience position, an education position, or a skill;
identify an online content account corresponding to the member of the social network service based on the network search, the online content account being hosted by an online content hosting service from the specific set and distinct from said social network service, wherein the online content account is identified based on member profile attributes of the member;
cause display, via a user interface in a device, of a prompt superimposed over a member profile page associated with the member of the social network service, the prompt providing the member with an option to bind the online content account with the member profile page;
upon receiving a command to bind the online content account with the member profile page, periodically access the online content account;
retrieve content posted by the online content account from the online content hosting service using the online content account bound with the member profile page, wherein the content was posted using the online content account bound with the member profile page; and
periodically update the member profile page to include the content retrieved from the content hosting service using the online content account bound with the member profile page, wherein the member profile page corresponds to a member profile webpage hosted by a webserver of the social network service.

6. The system of claim 5, wherein the instructions include instructions to:
receive user input of a command to bind the online content account with the member profile page, the command including a specification of user credential information or authentication token information; and
bind the online content account with the member profile page, Wherein the binding comprises:
storing the user credential information or authentication token information in a database; and
accessing content from the online content account, based on the stored user credential information or authentication token information.

7. The system of claim 5, wherein the content posted on the online content account corresponds to at least one of text content, image content, video content, audio content, and slideshow content.

8. The system of claim 5, wherein the member profile attributes include at least one of:
a name of the member;
an email address of the member;
a professional experience position of the member;
an education position of the member;
a skill of the member; and
a location of the member.

9. A non-transitory machine-readable storage medium having embodied thereon instructions executable by one or more machines to perform operations comprising:
extracting one or more member profile attributes from member profile data associated with a member of a social network service;
performing a network search for online content accounts associated with account owner attributes that match the extracted member profile attributes, wherein a scope of the network search is based on accessing content hosting service information indicating that a specific set of online content hosting services to be searched are associated with at least one of the member profile attributes, the at least one member profile attribute corresponding to a professional experience position, an education position, or a skill;
identifying an online content account corresponding to the member of the social network service based on the network search, the online content account being hosted by an online content hosting service from the specific set and distinct from said social network service, wherein the online content account is identified from the online content accounts based on member profile attributes of the member; and
causing display, via a user interface in a device, of a prompt superimposed over a member profile page associated with the member of the social network service, the prompt providing the member with an option to bind the online content account with the member profile page;

upon receiving a command to bind the online content account with the member profile page, periodically accessing the online content account;

retrieving content posted by the online content account from the online content hosting service using the online content account bound with the member profile page, wherein the content was posted using the online content account bound with the member profile page; and periodically updating the member profile page by posting the content retrieved from the content hosting service to the member profile page using the online content account bound with the member profile page, wherein the member profile page corresponds to a member profile webpage hosted by a webserver of the social network service.

10. The storage medium of claim 9, wherein the operations further comprise:

receiving user input of a command to bind the online content account with the member profile page, the command including a specification of user credential information or authentication token information; and binding the online content account with the member profile page, wherein the binding comprises:

storing the user credential information or authentication token information in a database; and accessing content from the online content account, based on the stored user credential information or authentication token information.

11. The storage medium of claim 9, wherein the content posted on the online content account corresponds to at least one of text content, image content, video content, audio content, and slideshow content.

* * * * *

UNITED STATES PATENT AND TRADEMARK OFFICE
CERTIFICATE OF CORRECTION

PATENT NO. : 10,382,500 B2  
APPLICATION NO. : 14/192201  
DATED : August 13, 2019  
INVENTOR(S) : Berger et al.

Page 1 of 1

It is certified that error appears in the above-identified patent and that said Letters Patent is hereby corrected as shown below:

In the Claims

In Column 18, Line 20, in Claim 6, delete "Wherein" and insert --wherein-- therefor Signed and Sealed this  
Second Day of November, 2021

Drew Hirshfeld  
*Performing the Functions and Duties of the*  
*Under Secretary of Commerce for Intellectual Property and*  
*Director of the United States Patent and Trademark Office*